US011259233B2

(12) United States Patent
Joseph et al.

(10) Patent No.: US 11,259,233 B2
(45) Date of Patent: Feb. 22, 2022

(54) SIGNALING PORT INFORMATION OF USER EQUIPMENT PORTS IN A WIRELESS COMMUNICATION SYSTEM INCLUDING A RADIO ACCESS NETWORK

(71) Applicant: QUALCOMM Incorporated, San Diego, CA (US)

(72) Inventors: Vinay Joseph, San Diego, CA (US); Rajat Prakash, San Diego, CA (US); Peerapol Tinnakornsrisuphap, San Diego, CA (US); Fatih Ulupinar, San Diego, CA (US); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,374

(22) Filed: Feb. 13, 2020

(65) Prior Publication Data
US 2020/0267622 A1    Aug. 20, 2020

Related U.S. Application Data

(60) Provisional application No. 62/806,431, filed on Feb. 15, 2019.

(51) Int. Cl.
*H04W 40/24* (2009.01)
*H04L 29/06* (2006.01)
(Continued)

(52) U.S. Cl.
CPC .......... *H04W 40/246* (2013.01); *H04L 41/12* (2013.01); *H04L 45/02* (2013.01); *H04L 45/26* (2013.01); *H04L 69/18* (2013.01); *H04W 8/005* (2013.01)

(58) Field of Classification Search
CPC ... H04W 40/246; H04W 8/005; H04W 40/24; H04W 40/242; H04W 40/248;
(Continued)

(56) References Cited

U.S. PATENT DOCUMENTS 10,206,092 B1 *   2/2019   Mellquist ............ H04L 41/0806
2001/0030969 A1 * 10/2001   Donaghey ............... H04L 45/10
                                                          370/397
(Continued)

FOREIGN PATENT DOCUMENTS

CN         103354509 B      8/2016
WO         2016141213 A1    9/2016
(Continued)

OTHER PUBLICATIONS

"Derive." Dictionary.com Dictionary, https://dictionary.com/browse/derive?s=t. Accessed Sep. 1, 2020. (Year: 2020).*
(Continued)

*Primary Examiner* — Joshua Kading
(74) *Attorney, Agent, or Firm* — Qualcomm Incorporated

(57) ABSTRACT

Certain aspects of the disclosure provide techniques for signaling port information of user equipment (UE) ports in a wireless communication system including a radio access network. Certain aspects provide a method for wireless communication. The method includes receiving, at a network node, port information of one or more ports of one or more UEs. The method further includes deriving a network topology indicating connectivity between devices comprising the one or more UEs based on the port information of the one or more ports.

28 Claims, 12 Drawing Sheets

(51) Int. Cl.
  *H04L 12/24* (2006.01)
  *H04L 12/751* (2013.01)
  *H04L 12/721* (2013.01)
  *H04W 8/00* (2009.01)
  *H04L 69/18* (2022.01)
  *H04L 41/12* (2022.01)
  *H04L 45/02* (2022.01)
  *H04L 45/00* (2022.01)

(58) Field of Classification Search
  CPC ........ H04W 40/30; H04L 45/02; H04L 45/26; H04L 41/12
  See application file for complete search history.

(56) References Cited

U.S. PATENT DOCUMENTS

| | | | |
|---|---|---|---|
| 2015/0207724 A1* | 7/2015 | Choudhury | H04L 45/42 370/255 |
| 2015/0207793 A1* | 7/2015 | Mohamed | H04L 63/166 726/6 |
| 2016/0007340 A1 | 1/2016 | Park et al. | |
| 2016/0073395 A1* | 3/2016 | Liberg | H04L 69/164 370/329 |
| 2016/0094398 A1* | 3/2016 | Choudhury | H04L 45/42 370/254 |
| 2016/0285695 A1* | 9/2016 | Yamashita | H04L 41/12 |
| 2017/0063675 A1* | 3/2017 | Miyabe | H04L 69/08 |
| 2017/0302562 A1* | 10/2017 | Lin | H04L 45/08 |
| 2018/0054772 A1* | 2/2018 | Tan | H04W 40/12 |
| 2018/0131671 A1 | 5/2018 | Thaler et al. | |
| 2018/0270840 A1 | 9/2018 | Griot et al. | |
| 2018/0287884 A1 | 10/2018 | Atkinson et al. | |
| 2018/0338265 A1 | 11/2018 | Goel et al. | |
| 2019/0021044 A1 | 1/2019 | Pang et al. | |
| 2019/0132210 A1* | 5/2019 | Zheng | H04L 41/0213 |
| 2019/0190811 A1* | 6/2019 | Selvaraj | H04L 45/025 |
| 2020/0036676 A1* | 1/2020 | Kim | H04L 61/6022 |
| 2020/0128087 A1* | 4/2020 | Yu | H04L 29/08 |
| 2020/0146077 A1* | 5/2020 | Li | H04W 76/10 |
| 2020/0259741 A1* | 8/2020 | Park | H04L 45/586 |

FOREIGN PATENT DOCUMENTS

| | | |
|---|---|---|
| WO | 2018186681 A1 | 10/2018 |
| WO | 2019019906 A1 | 1/2019 |

OTHER PUBLICATIONS

3rd Generation Partnership Project; Technical Specification Group Services and System Aspects; Study on enhancement of 5GS for Vertical and LAN Services, 3GPP TR 23.734 V16.0.0, Rel. 16, Dec. 2018. (Year: 2018).*

International Search Report and Written Opinion—PCT/US2020/018325—ISA/EPO—dated Apr. 22, 2020.

* cited by examiner

SIGNALING PORT INFORMATION OF USER EQUIPMENT PORTS IN A WIRELESS COMMUNICATION SYSTEM INCLUDING A RADIO ACCESS NETWORK

CROSS-REFERENCE TO RELATED APPLICATION(S)

This application claims benefit of and priority to U.S. Provisional Application No. 62/806,431, filed Feb. 15, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and to techniques for signaling port information of user equipment ports in a wireless communication system including a radio access network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide certain advantages.

Certain aspects provide a method for wireless communication. The method includes receiving, at a network node, port information of one or more ports of one or more user equipments (UEs). The method further includes deriving, by the network node, a network topology indicating connectivity between devices comprising the one or more UEs based on the port information of the one or more ports.

Certain aspects provide a method for wireless communication. The method includes generating, by a network node, port information for one or more ports of one or more user equipments (UEs). The method further includes generating, by the network node, a response message for a link layer discovery protocol (LLDP) received by a UE of the one or more UEs on a first port of the UE using port information generated for the first port.

Certain aspects provide a method for wireless communication. The method includes transmitting, from a user equipment (UE) to a network node, port information of one or more ports of the UE using one or more of access stratum (AS) signaling or non-access stratum (NAS) signaling. The method further includes generating, by the UE, a response message for a link layer discovery protocol (LLDP) received by the UE.

Certain aspects provide a user equipment (UE) configured for wireless communication, comprising: a memory, and a processor communicatively coupled to the memory. In some examples, the processor is configured to transmit, to a network node, port information of one or more ports of the UE using one or more of access stratum (AS) signaling or non-access stratum (NAS) signaling. In some examples, the processor is configured to generate a response message for a link layer discovery protocol (LLDP) received by the UE.

Certain aspects provide a network node for wireless communication, comprising a memory and a processor communicatively coupled to the memory. In some examples, the processor is configured to receive port information of one or more ports of one or more user equipments (UEs). In some examples, the processor is configured to derive a network topology indicating connectivity between devices comprising the one or more UEs based on the port information of the one or more ports.

Certain aspects provide a network node for wireless communication. In some examples, the network node includes a means for receiving port information of one or more ports of one or more user equipments (UEs). In some examples, the network node includes a means for deriving a network topology indicating connectivity between devices comprising the one or more UEs based on the port information of the one or more ports.

Certain aspects provide a non-transitory computer-readable storage medium that stores instructions that, when executed by a processor of a network node, causes the network node to perform a method of wireless communication. In some examples, the method includes receiving port information of one or more ports of one or more user equipments (UEs). In some examples, the method includes deriving a network topology indicating connectivity between devices comprising the one or more UEs based on the port information of the one or more ports.

Certain aspects provide a network node for wireless communication. In some examples, the network node includes a memory and a processor communicatively coupled to the memory. In some examples, the processor is configured to generate port information for one or more ports of one or more user equipments (UEs). In some examples, the processor is configured to generate a response message for a link layer discovery protocol (LLDP) received by a UE of the one or more UEs on a first port of the UE using port information generated for the first port.

Certain aspects provide a network node for wireless communication. In some examples, the network node includes means for generating port information for one or more ports of one or more user equipments (UEs). In some examples, the network node includes means for generating a response message for a link layer discovery protocol (LLDP) received by a UE of the one or more UEs on a first port of the UE using port information generated for the first port.

Certain aspects provide a non-transitory computer-readable storage medium that stores instructions that, when executed by a processor of a network node, causes the network node to perform a method of wireless communication. In some examples, the method includes generating port information for one or more ports of one or more user equipments (UEs). In some examples, the method includes generating a response message for a link layer discovery protocol (LLDP) received by a UE of the one or more UEs on a first port of the UE using port information generated for the first port.

Certain aspects provide a user equipment (UE) for wireless communication. In some examples, the UE includes means for transmitting to a network node, port information of one or more ports of the UE using one or more of access stratum (AS) signaling or non-access stratum (NAS) signaling. In some examples, the UE includes means for generating a response message for a link layer discovery protocol (LLDP) received by the UE.

Certain aspects provide a non-transitory computer-readable storage medium that stores instructions that, when executed by a processor of a user equipment (UE), causes the UE to perform a method of wireless communication. In some examples, the method includes transmitting to a network node, port information of one or more ports of the UE using one or more of access stratum (AS) signaling or non-access stratum (NAS) signaling. In some examples, the network node includes generating a response message for a link layer discovery protocol (LLDP) received by the UE.

In certain aspects, port information of a port comprises one or more of identifier information of the port or identifier information of one or more neighboring ports of the port.

In certain aspects, the identifier information comprises one or more of one or more medium access control (MAC) addresses, or one or more chassis identifiers.

In certain aspects, the port information is received via one or more of access stratum (AS) signaling or non-access stratum (NAS) signaling.

In certain aspects, the network node receives the port information via one or more intermediate nodes from the one or more UEs.

In certain aspects, the one or more intermediate nodes comprise one or more of a radio access network (RAN) node, an access and mobility management function (AMF), a session management function (SMF), or a policy control function (PCF).

In certain aspects, the port information of the one or more ports comprises port information of ports associated with multiple different protocol data unit (PDU) sessions, wherein the port information of ports associated with multiple different PDU sessions is received via separate signaling for each of the multiple different PDU sessions.

In certain aspects, the port information is received via signaling during one or more of a protocol data unit (PDU) session establishment, a PDU session modification, or a UE registration.

In certain aspects, at least one port of the one or more ports comprises an intermediate port configured to carry traffic with a final destination that is not local to a UE associated with the at least one port.

In certain aspects, a response message for a link layer discovery protocol (LLDP) received by a UE of the one or more UEs is generated by one of the UEs, a UE adaptor associated with the UE, the network node, or an intermediate node.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
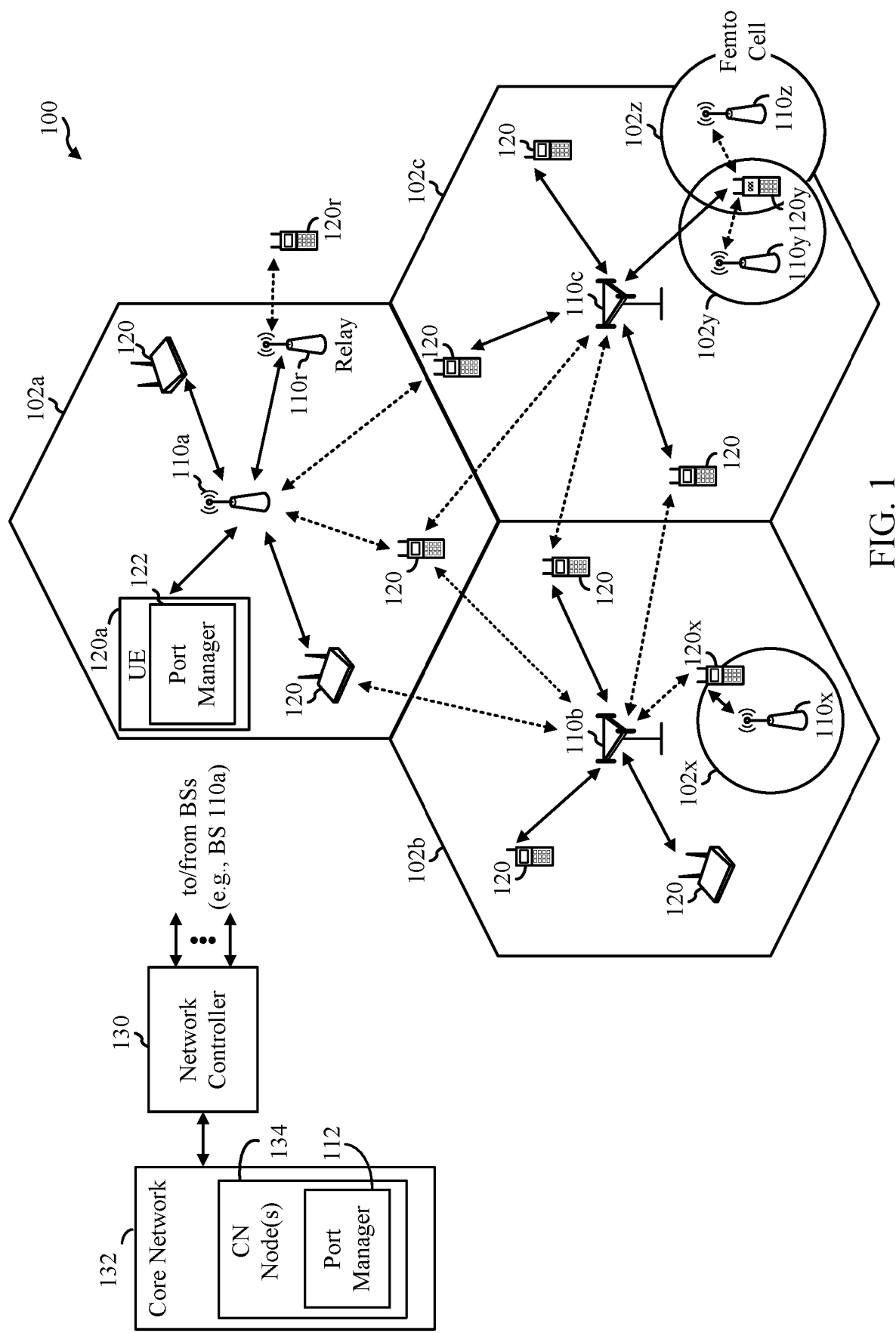
FIG. 1 is a block diagram conceptually illustrating an example telecommunications system, in accordance with certain aspects of the present disclosure.

Aspects of the present disclosure provide apparatus, methods, processing systems, and computer readable mediums for signaling port information of user equipment ports in a wireless communication system including a radio access network.

In a conventional wireline Ethernet network, different devices may conventionally be interconnected by wireline (e.g., wireline link, wireline cable). Some devices may be directly connected to one another, in that a port on one device is directly connected to a port on another device via a wireline. Further, some devices may be connected via one or more intermediate devices such as a network bridge or switch. Examples may be further described with respect to a network bridge, though the aspects discussed herein may similarly be applicable to other types of intermediate devices. For example, the network bridge includes a plurality of ports, and a port of one device may be connected to one port of the network bridge via a wireline, and a port of another device may be connected to another port of the network bridge via a wireline, thereby connecting the devices together via the network bridge. In certain aspects, since traffic is sent from one source device to another destination device in the Ethernet network, and the bridge acts as an intermediary in that traffic does not have a final destination as the bridge itself, ports of the bridge that pass such traffic from source to destination are referred to as intermediate ports. In addition, there may be several bridges in between a source device and a destination device, and ports of bridges may be interconnected via wirelines as part of the Ethernet network. The devices can therefore exchange Ethernet frames with one another, including via one or more bridges, which may forward the Ethernet frames to the appropriate port based on addressing in the Ethernet frames.

As shown by certain embodiments discussed herein, it may be desirable to replace a network bridge or direct connection and its conventional wireline connection(s) with a wireless communication system (WCS), such as a WCS corresponding to the 3GPP 5G NR standard or the 3GPP 4G LTE standard. Accordingly, in certain embodiments of the present disclosure, a network bridge or direct wireline connection used in a wireline Ethernet network may be replaced with what is referred to herein as a WCS switch (WCS-SW). Utilizing the WCS-SW, wireline connection(s) associated with the network bridge or direct connection can be replaced with wireless connection(s). This may be useful in a number of scenarios, such as those where wireline connections are not practical or feasible. For example, such use of a WCS-SW may be useful for internet of things (IoT) applications where there are a large number of devices over large areas and Industrial IoT applications where cable management associated with wireline solutions is undesirable.

In order for devices, network bridges, and/or in some cases WCS-SWs, to operate properly, they need to be configured. For example, in certain embodiments of this disclosure a central entity, such as a centralized network configuration (CNC), may operate to configure any entity such as a device, network bridge, and/or WCS-SW in a network, such as with appropriate forwarding tables, bandwidth reservations etc. For the central entity to configure these entities, it may need to derive a network topology indicating connectivity between the entities in the network. A network topology may relate to a layout of a network. For example, the network topology may describe one or more of how different nodes in a communication network are connected to each other (e.g., link properties, channel properties, and/or node properties) and how they communicate (e.g., communication protocols).

To derive the network topology, the central entity may receive port information associated with each of the ports (e.g., intermediate ports only or standard ports only, or intermediate and standard ports) of the entities in the network. The port information for a given port may include identifier information (e.g., chassis identifier and/or medium access control (MAC) address) of the port itself, and/or identifier information of neighboring ports of the port. In certain aspects, a neighboring port of a port is one that is connected to the port via N or fewer hops (e.g., N or fewer Ethernet links, where an Ethernet link is between ports without any other ports in between) and N is a positive integer. Based on this port information, the central entity can derive the network topology.

In certain aspects, a device or network bridge having a port determines identifier information of neighboring ports of the port using a link layer discovery protocol (LLDP) (e.g., station and MAC connectivity discovery). As part of LLDP, the device or network bridge having a port may send messages on the port, and receive responses from devices or network bridges of neighboring ports including the identifier information of the neighboring ports. After gathering the identifier information of the neighboring ports, the device or network bridge may send the port information of its port to the central entity.

The WCS-SW includes one or more UEs, and one or more ports of the UEs (e.g., intermediate ports of the UEs) correspond to ports of the WCS-SW. Accordingly, certain aspects herein relate to techniques for signaling to the central entity port information about one or more ports of one or more such UEs, such as for the central entity to derive a network topology.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In certain aspects, a UE 120 and/or network node, such as in an example, core network (CN) node 134 is configured to signal port information according to various aspects discussed herein. Further, in certain aspects, a UE 120 and/or CN node 134 is configured to respond to LLDP messages according to various aspects discussed herein. As shown, the wireless communication network 100 may be in communication with the CN 132. The CN 132 may include one or more CN nodes 134 in communication with one or more base station (BSs) 110 and/or user equipment (UEs) 120 in the wireless communication network 100 via one or more interfaces.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal fast fourier transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

According to certain aspects, the CN nodes 134 and UEs 120 may be configured for signaling port information of UE ports in a wireless communication system, such as a radio access network (RAN). As shown in FIG. 1, a CN node 134 includes a port manager 112. The port manager 112 may be configured to receive port information of one or more ports of one or more UEs, and derive a network topology indicating connectivity between devices comprising the one or more UEs based on the port information of the one or more ports, in accordance with aspects of the present disclosure. In some examples, the port manager 112 may optionally receive the port information via one or more intermediate nodes from the one or more UEs. In some cases, the one or more intermediate nodes comprise one or more of a radio access network (RAN) node, an access and mobility management function (AMF), a session management function (SMF), or a policy control function (PCF).

In some examples, the port manager 112 may be configured to generate port information for one or more ports of one or more UEs, and generate a response message for a link layer discovery protocol (LLDP) received by a UE of the one or more UEs on a first port of the UE using port information generated for the first port.

As shown in FIG. 1, the UE 120a includes a port manager 122. The port manager 122 may be configured to transmit, to a network node, such as a core network node, port information of one or more ports of the UE using one or more of access stratum (AS) signaling (e.g., radio resource control (RRC) signaling and/or a MAC-control element (MAC-CE)) or non-access stratum (NAS) signaling, and generate a response message for a link layer discovery protocol (LLDP) received by the UE, in accordance with aspects of the present disclosure. In some examples, the port information of a port comprises one or more of identifier information of the port or identifier information of one or more neighboring ports of the port. For instance, the identifier information comprises one or more of one or more MAC addresses, or one or more chassis identifiers.

In some examples, functionality and communication between a core network node 134 and a UE 120a is sometimes referred to as NAS, in contrast to the AS which corresponds to functionality and communications between the UE and a RAN node. That is, in some examples, the NAS relates to a protocol for communications between the UE 120a and the CN node 134 that can be passed transparently through the RAN. Examples of NAS messages include update or attach messages, authentication messages, service requests, etc. Accordingly, the AS may relate to a protocol for communications between the UE 120a and a BS 110a.

The term "network node" is used broadly and, unless specifically indicated otherwise, is intended to describe a core network node (e.g., CN node 134), a RAN network node (e.g., BS 110a), or a node such as a central entity (e.g., CNC 717 of FIG. 7 below) outside of a distributed RAN (e.g., see FIG. 2 below) and a core network (e.g., CN 132 of FIG. 1) that, when connected and configured, enable performance of the functions described in the present disclosure. It should be noted that though certain aspects are described with respect to a core network node, they may be similarly applicable to other types of suitable network nodes.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
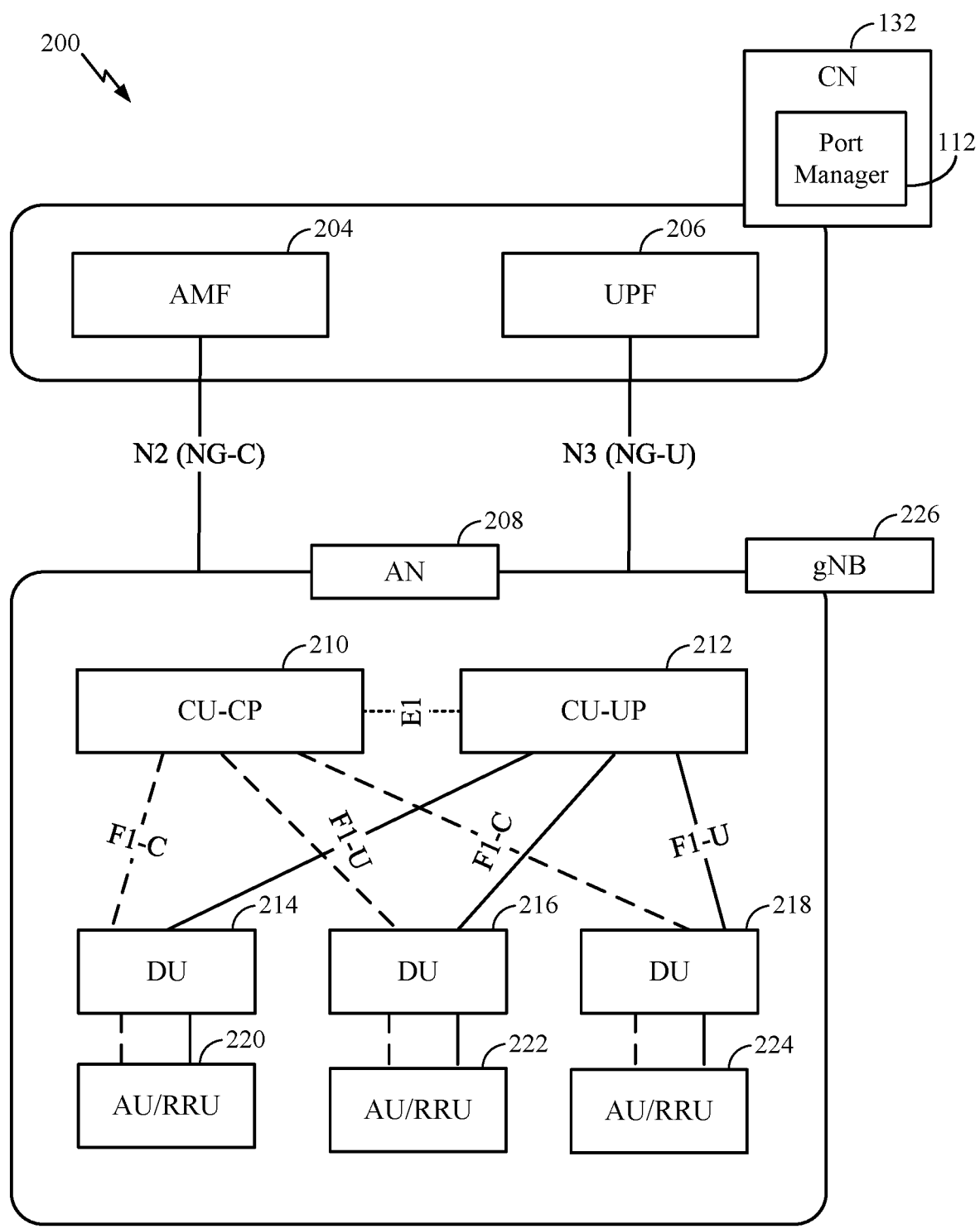
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes core network (CN) 132 (e.g., CN 132 of FIG. 1) and access node 208 (e.g., BS 110 of FIG. 1).

The CN 132 may host core network functions. CN 132 may be centrally deployed. CN 132 functionality may be offloaded (e.g., to advanced wireless services (AWS)), in an effort to handle peak capacity. The CN 132 may include the access and mobility management function (AMF) 204 and user plane function (UPF) 206. The AMF 204 and UPF 206 may perform one or more of the core network functions.

According to certain aspects, the CN 132 may be used to perform the various techniques and methods described herein. For example, as shown in FIG. 2, the CN 132 has a port manager 112 that may be configured for receiving port information of one or more ports of one or more UEs (e.g., UE 120 of FIG. 1), and deriving a network topology indicating connectivity between devices comprising the one or more UEs based on the port information of the one or more ports, in accordance with aspects of the present disclosure. In some examples, the port manager 112 may optionally receive the port information via one or more intermediate nodes from the one or more UEs. In some cases, the one or more intermediate nodes comprise one or more of a RAN node (e.g., AN 208 and/or gNB 226), the AMF 204, an SMF, or a PCF.

In some examples, the port manager 112 may be configured for generating port information for one or more ports of one or more UEs, and generating a response message for a link layer discovery protocol (LLDP) received by a UE of the one or more UEs on a first port of the UE using port information generated for the first port. Although not shown, components of the CN 132, such as a computer program product comprising a computer-readable medium having instructions stored (and/or encoded) thereon that are configured to be executable by one or more processors, may perform the operations described herein.

The AN 208 may communicate with the CN 132 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
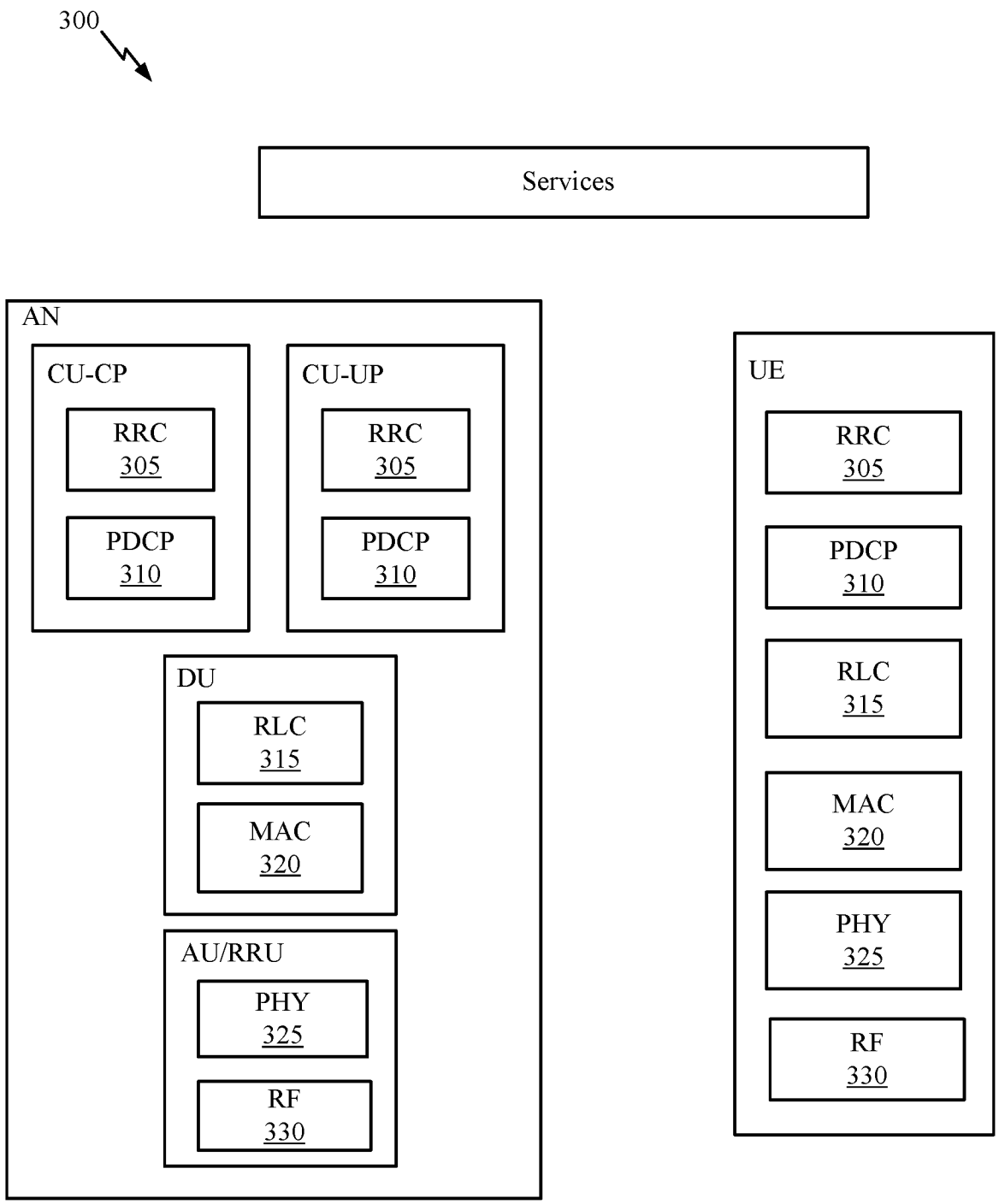
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 330 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
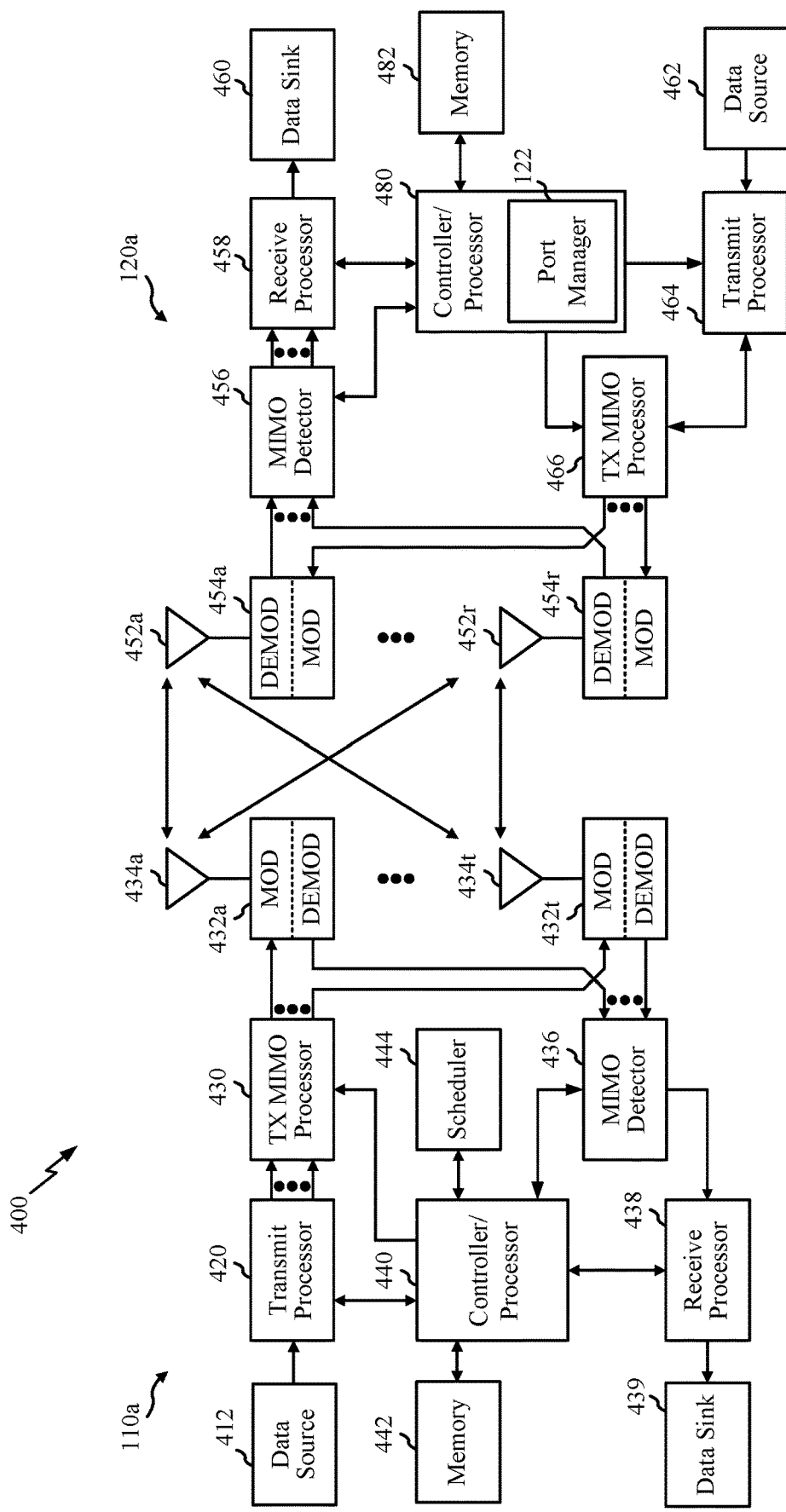
FIG. 4 is a block diagram conceptually illustrating a design of an example base station (BS) and user equipment (UE), in accordance with certain aspects of the present disclosure.

FIG. 4 is a block diagram illustrating example components 400 of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110 may perform or direct the execution of processes for the techniques described herein. The processor 480 and/or other processors and modules at the UE 120a may perform or direct the execution of processes for the techniques described herein. The memories 442 and 482 may store data and program codes for BS 110 and UE 120, respectively. A scheduler 444 may schedule UEs for data transmission on the downlink and/or uplink.

For example, antennas 452, processors 466, 458, 464, and/or controller/processor 480 of the UE 120a may be used to perform the various techniques and methods described herein. As shown in FIG. 4, the controller/processor 480 of the UE 120a has a port manager 122 that may be configured for transmitting, to a network node, such as a core network node, port information of one or more ports of the UE 120a using one or more of AS signaling (e.g., RRC signaling and/or a MAC-CE), or NAS signaling. The port manager 122 may also be configured for generating a response message for an LLDP received by the UE 120a, in accordance with aspects of the present disclosure. In some examples, the port information of a port includes one or more of identifier information of the port or identifier information of one or more neighboring ports of the port. For instance, the identifier information may include one or more of one or more MAC addresses, or one or more chassis identifiers. Although shown at the controller/processor 480, other components of the UE 120a may be used to perform the operations described herein.

Figure 5:
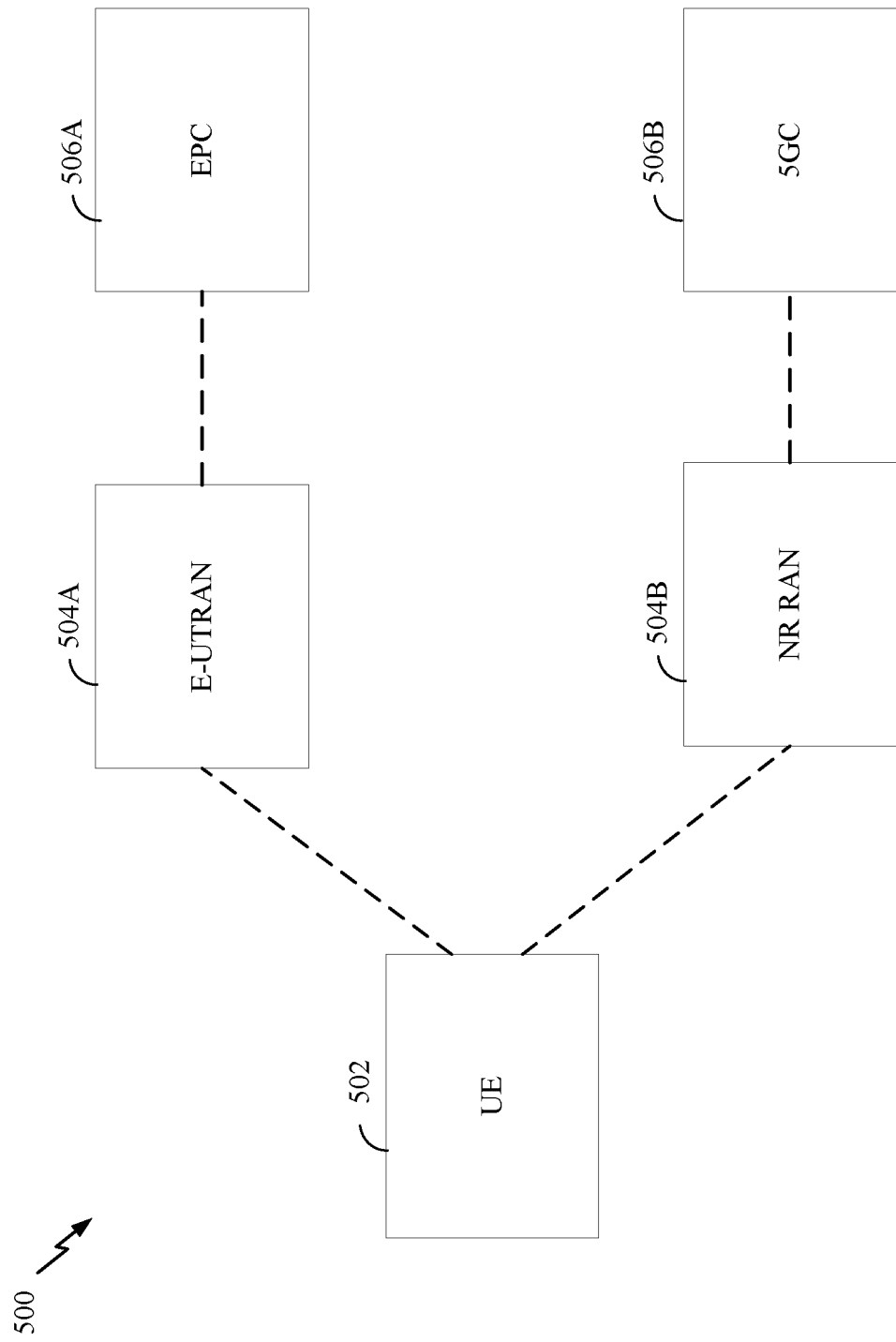
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
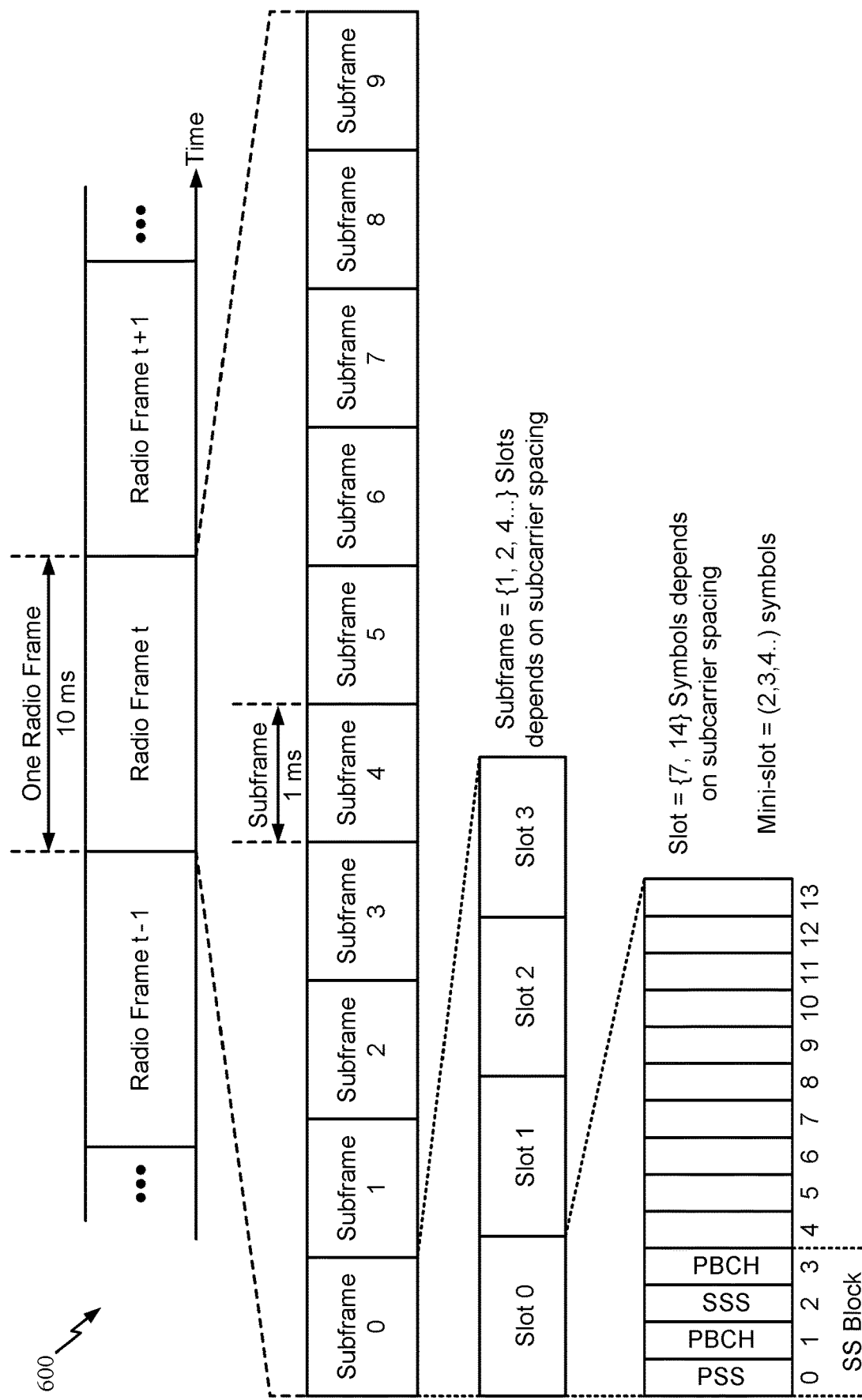
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Port Information Signaling

As discussed, certain aspects herein relate to techniques for signaling, to a central entity, port information about one or more ports of one or more UEs of a WCS-SW, such as for the central entity to derive a network topology. In certain aspects, the central entity is a centralized network configuration (CNC). In certain aspects, the one or more ports of the one or more UEs are intermediate ports of UEs. For example, a UE may include one or more standard ports and one or more intermediate ports. In certain aspects, standard ports are defined as ports that send/receive traffic with an initial source or final destination address local to the UE that includes the port(s). In certain aspects, intermediate ports are defined as ports that are used to forward traffic in the Ethernet network that have an initial source or final destination address not local to the UE that includes the port(s). Such intermediate ports are therefore similar in function to ports of a gateway or switch in a conventional wireline network.

Figure 7:
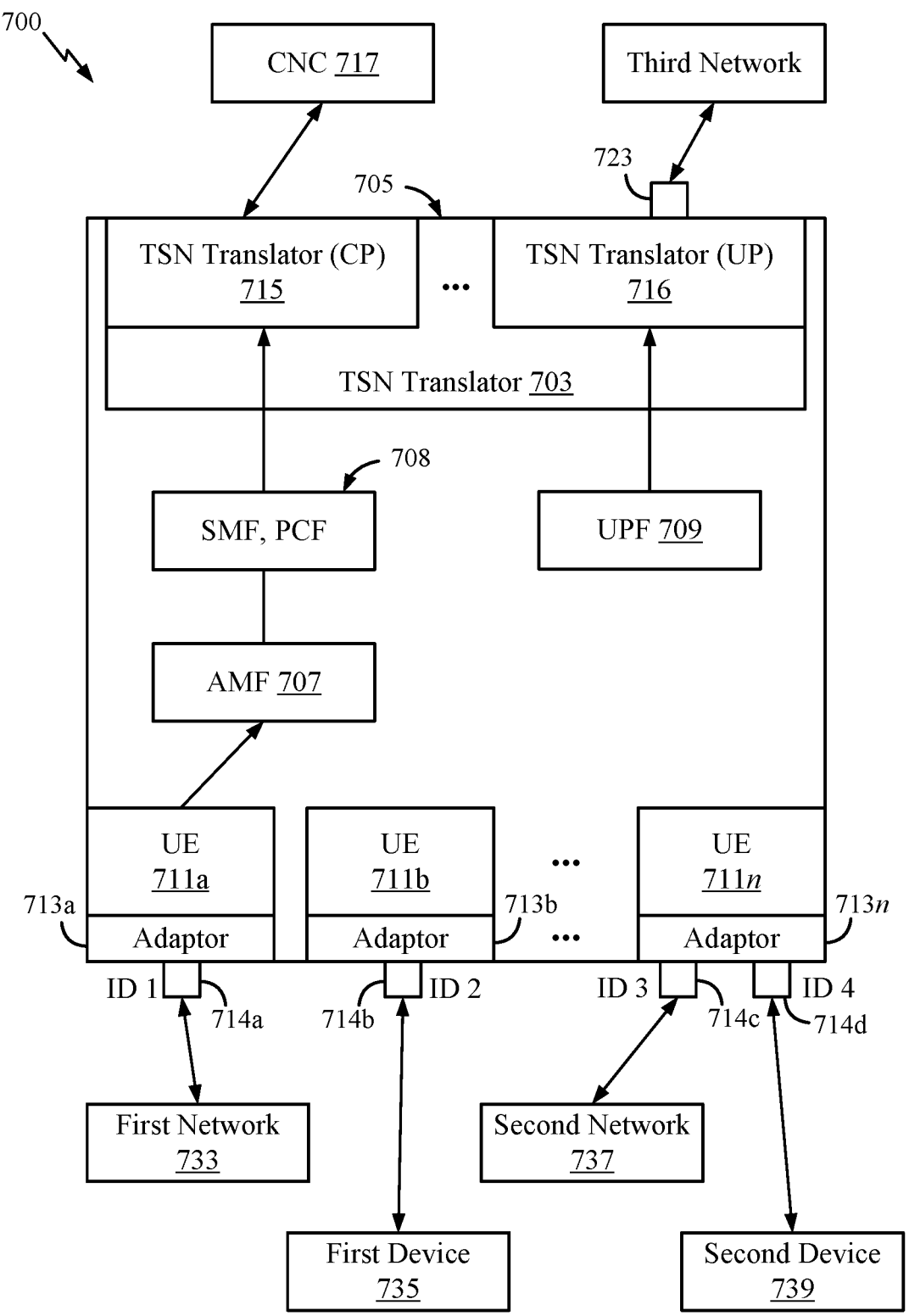
FIG. 7 illustrates an example Ethernet network including an example wireless communication system switch (WCS-SW), in accordance with certain aspects.

FIG. 7 illustrates an example Ethernet network 700 including an example WCS-SW 705, in accordance with certain aspects. WCS-SW 705 includes one or more functions of a core network (e.g., CN 132 of FIG. 1). In certain embodiments, the WCS-SW 705 includes one or more core network nodes (e.g., or other suitable network nodes), such as one or more of an AMF 707, a time sensitive networking (TSN) translator 703 (e.g., as described in 3GPP TR 23.734) including one or more of a control plane (CP) component 715 and a user plane (UP) component 716, an Ethernet adaptor 723, a UPF 709, and a session management function (SMF) and a policy control function (PCF) (collectively shown as SMF, PCF 708). In some examples, the AMF 707 may function similar to AMF 204 of FIG. 2, and the UPF 709 may function similar to UPF 206 of FIG. 2.

The WCS-SW 705 further includes a plurality of UEs 711a-711n (e.g., UEs 120 of FIG. 1, where n is a positive integer). Each UE 711 is coupled to one or more corresponding UE-adaptors 713, which act as network interfaces to an Ethernet network for a UE 711 and include one or more ports 714a-714d. As used herein, the plurality of UEs and the plurality of UE adaptors may sometimes be collectively referred to as UE 711 and UE adaptor 713, respectively. A UE adaptor 713 of a UE 711 may be integrated as hardware in the UE 711, configured as software in the UE 711, and/or externally coupled to the UE 711 (e.g., coupled by wireline). The ports 714a-714d of the UE adaptors 713 may not be physical ports configured to couple to a physical wire, but rather may include hardware and corresponding software components that are configured to implement the functionality of a physical port for wireless connection.

WCS-SW 705 may include fewer or greater number of UEs 711 and/or UE adaptors 713. As shown, a first UE 711a includes a first UE adaptor 713a that includes a first port 714a corresponding to a first port identifier (ID 1). In some examples, ID 1 may include one or more of a first MAC identifier, a first chassis identifier, and/or include other port identifier information. In the example shown, the first port 714a provides a wireless connection between the first UE 711a and a first network 733 (e.g., an intermediate port of a bridge of network 2) via the first adaptor 713a.

A second UE 711b includes a second UE adaptor 713b that includes a second port 714b corresponding to a second port identifier (ID 2). In some examples, ID 2 may include one or more of a second MAC identifier, a second chassis identifier, and/or include other port identifier information. In the example shown, the second port 714b provides a wireless connection between the second UE 711b and a first device 735 (e.g., a standard port of another UE) via the second adaptor 713b.

A third UE 711n includes a third UE adaptor 713n that includes: (i) a third port 714c corresponding to a third port identifier (ID 3), and (ii) a fourth port 714d corresponding to a fourth port identifier (ID 4). In some examples, ID 3 and ID 4 may include one or more of third/fourth MAC identifier, a third/fourth chassis identifier, and/or include other port identifier information, respectively. In the example shown, the third port 714c provides a wireless connection between the third UE 711n and a second network 737 (e.g., an intermediate port of a bridge of network 3), via the third adaptor 713n. The illustrated example also shows that the fourth port 714d provides a wireless connection between the third UE 711n and a second device 739 (e.g., a standard port of another UE) via the third adaptor 713n. Though not shown, it is appreciated that in some embodiments, one or more network nodes, such as one or more core network nodes, of WCS-SW 705 are coupled to UEs 711a-711n via a RAN (e.g., including a BS such as BS 110). In certain aspects, each of the ports 714a-714d are intermediate ports of the corresponding UEs 711a-711n.

One or more of the network nodes, such as one or more core network nodes, of WCS-SW 705 may be communicatively coupled (e.g., via wireline, wirelessly, etc.) to a central entity, shown as a CNC 717. For example, the CP component 715 of TSN translator 703 may be coupled to CNC 717 to provide a communication interface between the CNC 717 and one or more components of the WCS-SW 705 (e.g., SMF, PCF 708, AMF 707, UE 711, etc.). As discussed, CNC 717 may be configured to determine network topology indicating connectivity between devices including UEs 711. For CNC 717 to determine such network topology, it may need port information of each of the ports 714a-714d (e.g., intermediate ports) of UEs 711. Such port information for a given port may include identifier information (e.g., chassis identifier, medium access control (MAC) address, and/or other port identifier information) of the port itself, and/or identifier information of neighboring ports. In certain aspects, a neighboring port of a port is one that is connected to the port via N or fewer hops (e.g., N or fewer Ethernet links, where an Ethernet link is between ports without any other ports in between) and N is a positive integer.

Accordingly, in certain aspects, UEs 711 are configured to signal their port information to the one of the core network nodes of WCS-SW 705 coupled to CNC 717. The one of the core network nodes then sends the port information to the CNC 717. For example, UE 711 may signal the port information via a RAN (e.g., BS 110), which directly transmits the port information to the one of the core network nodes. In certain aspects, the UE 711 signals the port information via one or more additional intermediate nodes, in addition to the RAN.

In some examples, UEs 711 are configured to signal their port information to TSN translator 703 as the core network node coupled to CNC 717. In certain aspects, UEs 711 signal the port information via a RAN to AMF 707, which directly signals the port information to TSN translator 703. In certain aspects, AMF 707 signals the port information to TSN translator 703 via intermediate node such as a SMF, PCF 708. In certain aspects, the UE 711 signals the port information to one or more core network nodes using one or more of access stratum (AS) signaling (e.g., radio resource control (RRC) signaling and/or a MAC-control element (MAC-CE)), or non-access stratum (NAS) signaling.

Figure 8:
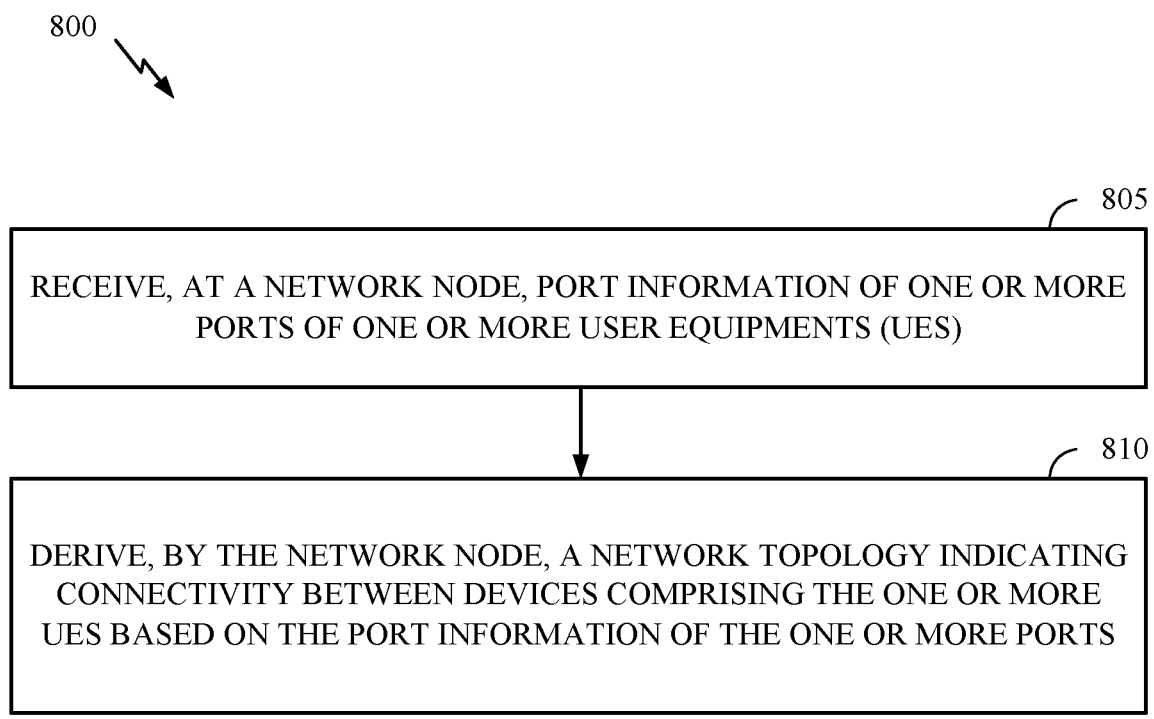
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a central network node (e.g., a node of CN 132 of FIG. 2, such as TSN translator 703, CNC 717, etc. of FIG. 7). The operations 800 may be complimentary operations by the central network node to operations performed by a UE, such as operations 900 described with respect to FIG. 9. Operations 800 may be implemented as software components that are executed and run on one or more processors.

The operations 800 may begin, at block 805, by receiving, at a network node, port information of one or more ports of one or more user equipments (UEs). For example, block 805 can be performed by TSN translator 703. Operations 800 continue at block 810 by deriving, by the network node, a network topology indicating connectivity between devices comprising the one or more UEs based on the port information of the one or more ports. For example, block 810 can be performed by CNC 717.

In certain aspects, port information of a port comprises one or more of identifier information of the port or identifier information of one or more neighboring ports of the port.

In certain aspects, the identifier information comprises one or more of one or more medium access control (MAC) addresses, or one or more chassis identifiers.

In certain aspects, the port information is received via one or more of access stratum (AS) signaling or non-access stratum (NAS) signaling.

In certain aspects, the network node receives the port information via one or more intermediate nodes from the one or more UEs.

In certain aspects, the one or more intermediate nodes comprise one or more of a radio access network (RAN) node, an access and mobility management function (AMF), a session management function (SMF), or a policy control function (PCF).

In certain aspects, the port information of the one or more ports comprises port information of ports associated with multiple different protocol data unit (PDU) sessions, wherein the port information of ports associated with multiple different PDU sessions is received via separate signaling for each of the multiple different PDU sessions.

In certain aspects, the port information is received via signaling during one or more of a protocol data unit (PDU) session establishment, a PDU session modification, or a UE registration.

In certain aspects, at least one port of the one or more ports comprises an intermediate port configured to carry traffic with a final destination that is not local to a UE associated with the at least one port.

In certain aspects, a response message for a link layer discovery protocol (LLDP) received by a UE of the one or more UEs is generated by one of the UEs, a UE adaptor associated with the UE, the network node, or an intermediate node.

Figure 9:
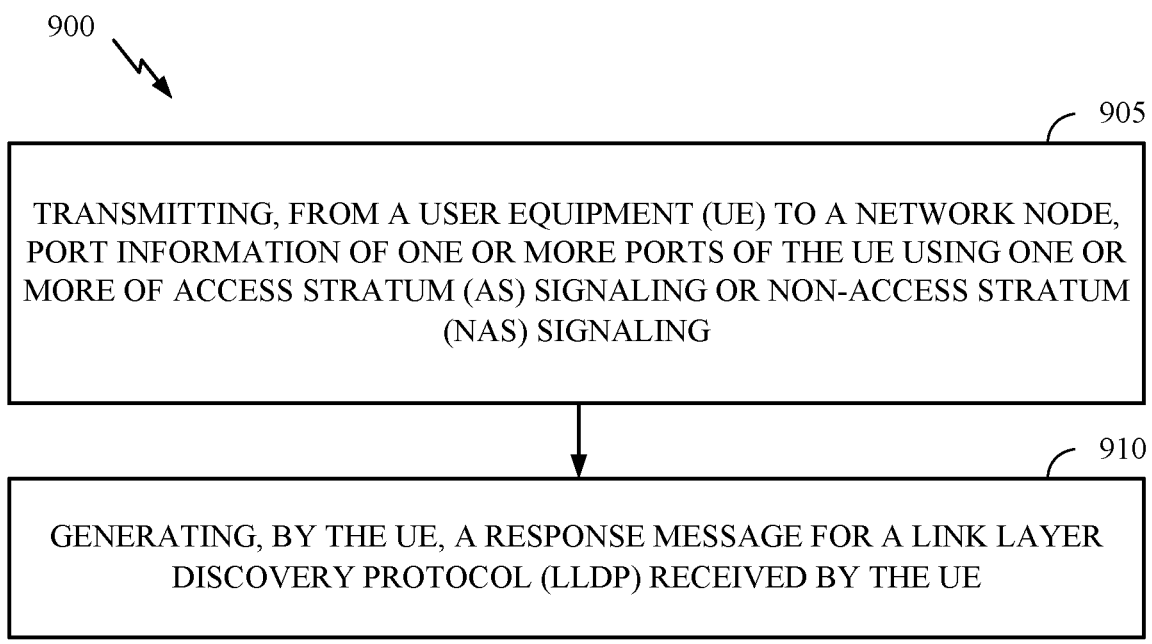
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a UE (e.g., such as a UE 120 in the wireless communication network 100 of FIG. 1, UE 711 of FIG. 7, etc.). Operations 900 may be implemented as software components that are executed and run on one or more processors (e.g., processor 480 of FIG. 4). Further, the transmission and reception of signals by the UE in operations 900 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 900 may begin, at block 905, by transmitting, from a user equipment (UE) to a network node (e.g., a node of CN 132 of FIG. 2, such as TSN translator 703, CNC 717, etc. of FIG. 7), port information of one or more ports of the UE using one or more of access stratum (AS) signaling or non-access stratum (NAS) signaling. Operations 900 continue at block 910 by generating a response message for a link layer discovery protocol (LLDP) received by the UE.

In certain aspects, port information of a port comprises one or more of identifier information of the port or identifier information of one or more neighboring ports of the port.

In certain aspects, the identifier information comprises one or more of one or more medium access control (MAC) addresses, or one or more chassis identifiers.

In certain aspects, the port information is transmitted via one or more intermediate nodes.

In certain aspects, the one or more intermediate nodes comprise one or more of a radio access network (RAN) node, an access and mobility management function (AMF), a session management function (SMF), or a policy control function (PCF).

In certain aspects, the port information of the one or more ports comprises port information of ports associated with multiple different protocol data unit (PDU) sessions, wherein the port information of ports associated with multiple different PDU sessions is transmitted/received via separate signaling for each of the multiple different PDU sessions. For example, a UE 711 may have multiple different PDU sessions and accordingly transmit the port information of ports used for the different PDU sessions, separately.

In certain aspects, the port information is transmitted/received via signaling during one or more of a PDU session establishment, a PDU session modification, or a user equipment registration.

As discussed, in an Ethernet network, devices (e.g., UEs 711) may use LLDP message exchange for obtaining identifier information of neighboring ports, such as to report to the CNC 717 for it to determine the network topology. In certain aspects, when a UE 711 receives on a port an LLDP message requesting identifier information of the port (e.g., from an external network), the UE 711 itself is configured to generate and transmit a response message including the port's identifier information to the device sending the LLDP message. In certain aspects, the UE adaptor 713 associated with the UE 711 generates and transmits the response message in response to the LLDP message. In certain aspects, the LLDP message is forwarded in the network (e.g., by UE 711) to a network node or an intermediate node (e.g., TSN translator 703, AMF 707, UPF 709, etc.) as discussed, and the network node or the intermediate node is configured to generate and transmit the response message to the device sending the LLDP message instead of the UE 711.

In certain aspects, UEs 711 are not configured to signal their port information to the one of the network nodes of WCS-SW 705 coupled to CNC 717. Instead, in certain aspects, the network node is configured to generate identifier information for each of the ports of the UEs of WCS-SW 705. For example, the TSN translator 703 may be configured to generate identifier information (e.g., randomly, algorithmically, etc.) for each of the ports 1-4 of the UEs 711 of WCS-SW 705. The generated identifier information may be different than the actual identifier information of the ports used for routing traffic in the network. This may help reduce network bandwidth for the UE signaling port information to the network node. In certain aspects, the network node further sends the port information of ports, including the generated identifier information, to the CNC 717 for generating a network topology.

In certain aspects, the port information of the one or more ports comprises port information of ports associated with multiple different PDU sessions, wherein the port information of ports associated with multiple different PDU sessions is transmitted/received via separate signaling for each of the multiple different PDU sessions (e.g., transmitted by the UE and received by the CN). In certain aspects, the port information is transmitted/received via signaling during one or more of a PDU session establishment, a PDU session modification, or a user equipment registration.

In certain aspects, when a UE 711 receives from a device (e.g., UE 711, network node, etc.) on a port an LLDP message requesting identifier information of the port (e.g., from an external network), the UE 711 forwards the LLDP message to the network node (or the message is otherwise sent in the network to the network node and the UE 711 ignores the LLDP message). The network node is then configured to generate and transmit a response message to the device instead of the UE 711. The network node is configured to include the generated identifier information of the port in the response message instead of the actual identifier information of the port. In other aspects, the network node sends the generated identifier information of the port to the UE 711 so the UE 711 or its corresponding UE adaptor 713 can generate and transmit the response message to the device. In other aspects, the network node sends the generated identifier information of the port to an intermediate node so the intermediate node can generate and transmit the response message to the device. Accordingly, the neighboring port information eventually sent to the CNC 717 also includes generated identifier information, instead of actual identifier information, so the CNC 717 can generate a network topology based on the generated identifier information.

In certain aspects, at least one port of the one or more ports comprises an intermediate port configured to carry traffic with a final destination that is not local to the UE.

In certain aspects, the response message is generated by one of the UE, an intermediate node, the network node, or a UE adaptor associated with the UE.

Figure 10:
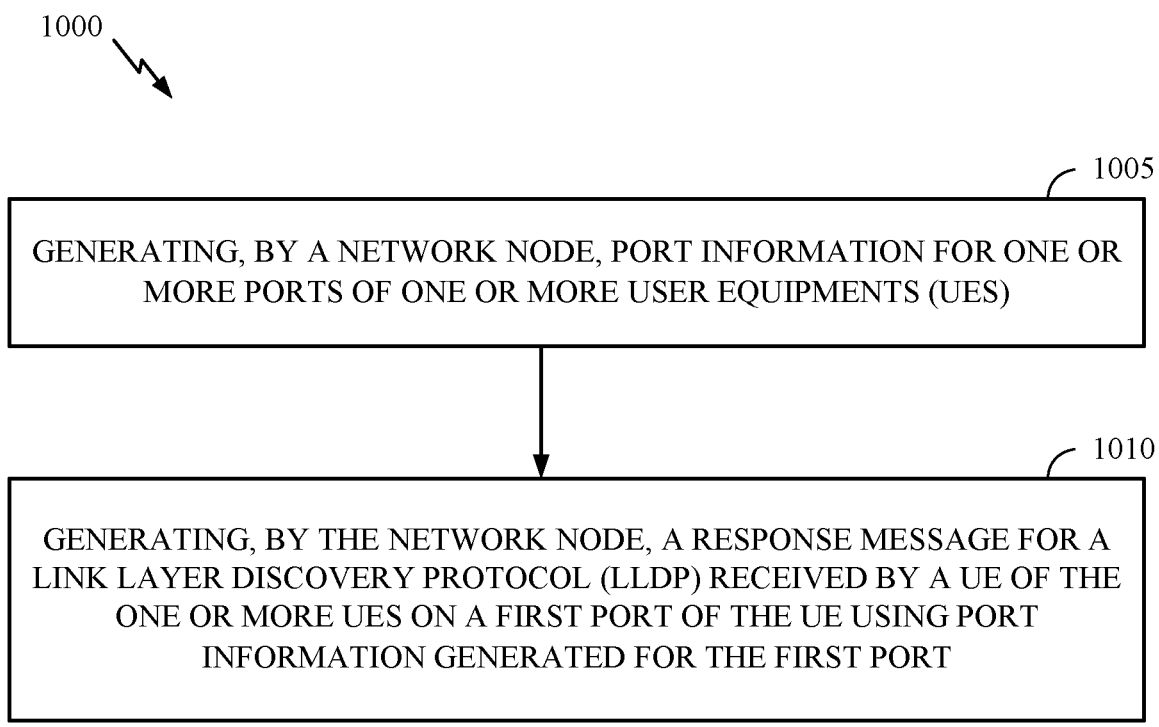
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by a central network node (e.g., a node of CN 132 of FIG. 2, such as TSN translator 703, CNC 717, etc. of FIG. 7). Operations 1000 may be implemented as software components that are executed and run on one or more processors.

The operations 1000 may begin, at block 1005, by generating, by a network node, port information for one or more ports of one or more user equipments (UEs). Operations 1000 continue at block 1010 by generating, by the network node, a response message for a link layer discovery protocol (LLDP) received by a UE of the one of the one or more UEs on a first port of the UE using port information generated for the first port.

In certain aspects, port information of a port comprises one or more of identifier information of the port or identifier information of one or more neighboring ports of the port.

In certain aspects, the identifier information comprises one or more of one or more medium access control (MAC) addresses, or one or more chassis identifiers.

In certain aspects, generated port information associated with a UE of the one or more UEs is sent to the UE.

In certain aspects, the port information of the one or more ports comprises port information of ports associated with multiple different protocol data unit (PDU) sessions, wherein the port information of ports associated with multiple different protocol data unit (PDU) sessions is generated separately for each of the multiple different PDU sessions.

In certain aspects, the port information is generated during one or more of a protocol data unit (PDU) session establishment, a PDU session modification, or a UE registration.

In certain aspects, the response message is generated by one of the UE, an intermediate node, the network node, or a UE adaptor associated with the UE.

Figure 11:
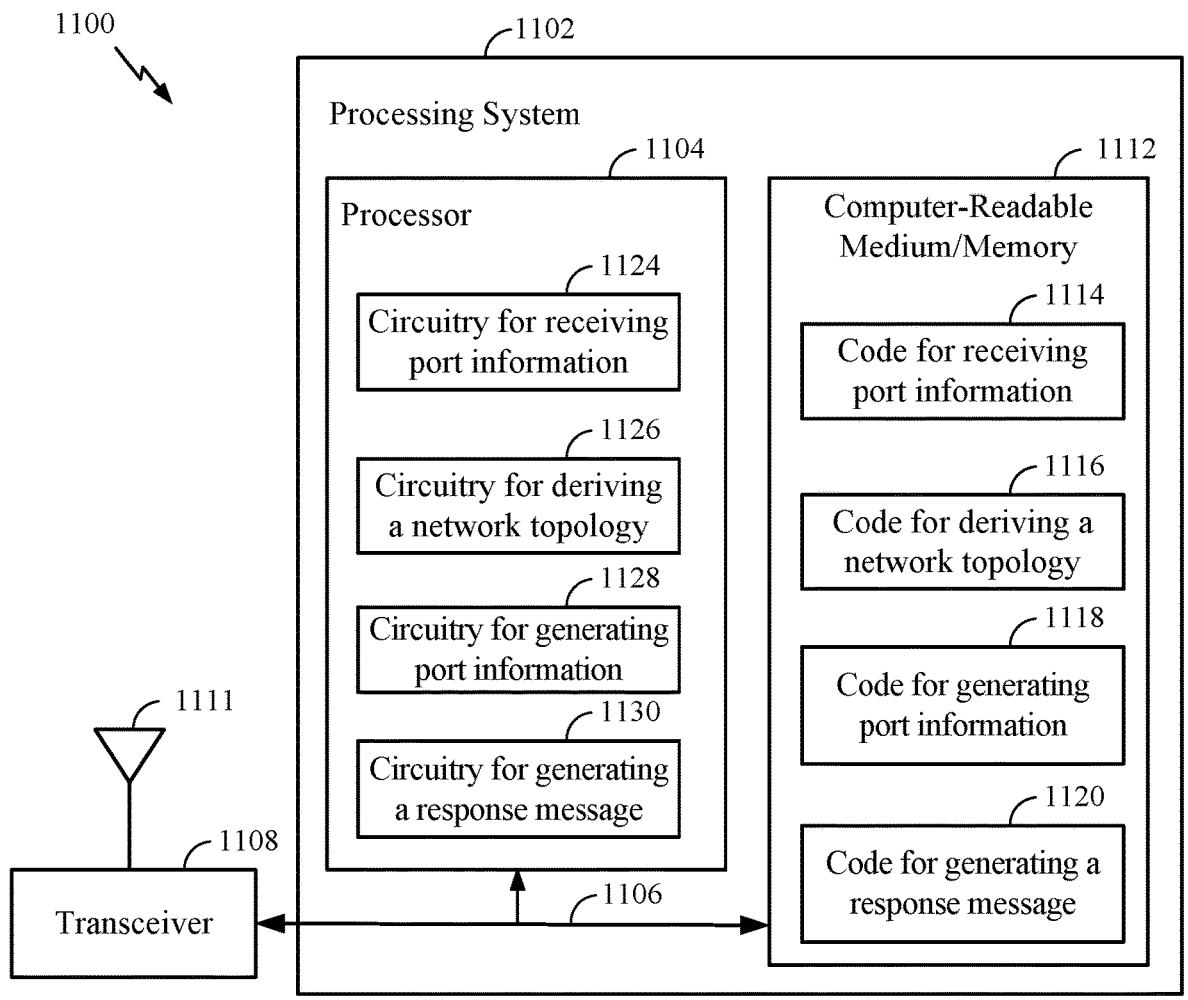
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8 and/or FIG. 10. The communications device 1100 includes a processing system 1102 coupled to a transceiver 1108. The transceiver 1108 is configured to transmit and receive signals for the communications device 1100 via an antenna 1111, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8 and/or FIG. 10 or other operations for performing the various techniques discussed herein for port information signaling. In certain aspects, computer-readable medium/memory 1112 stores code for receiving port information 1114, code for deriving a network topology 1116, code for generating port information 1118, and code for generating a response message 1120. In certain aspects, the processor 1104 has circuitry configured to implement the code stored in the computer-readable medium/memory 1112. The processor 1104 includes circuitry for receiving port information 1124, circuitry for deriving a network topology 1126, circuitry for generating port information 1128, and circuitry for generating a response message 1130.

Figure 12:
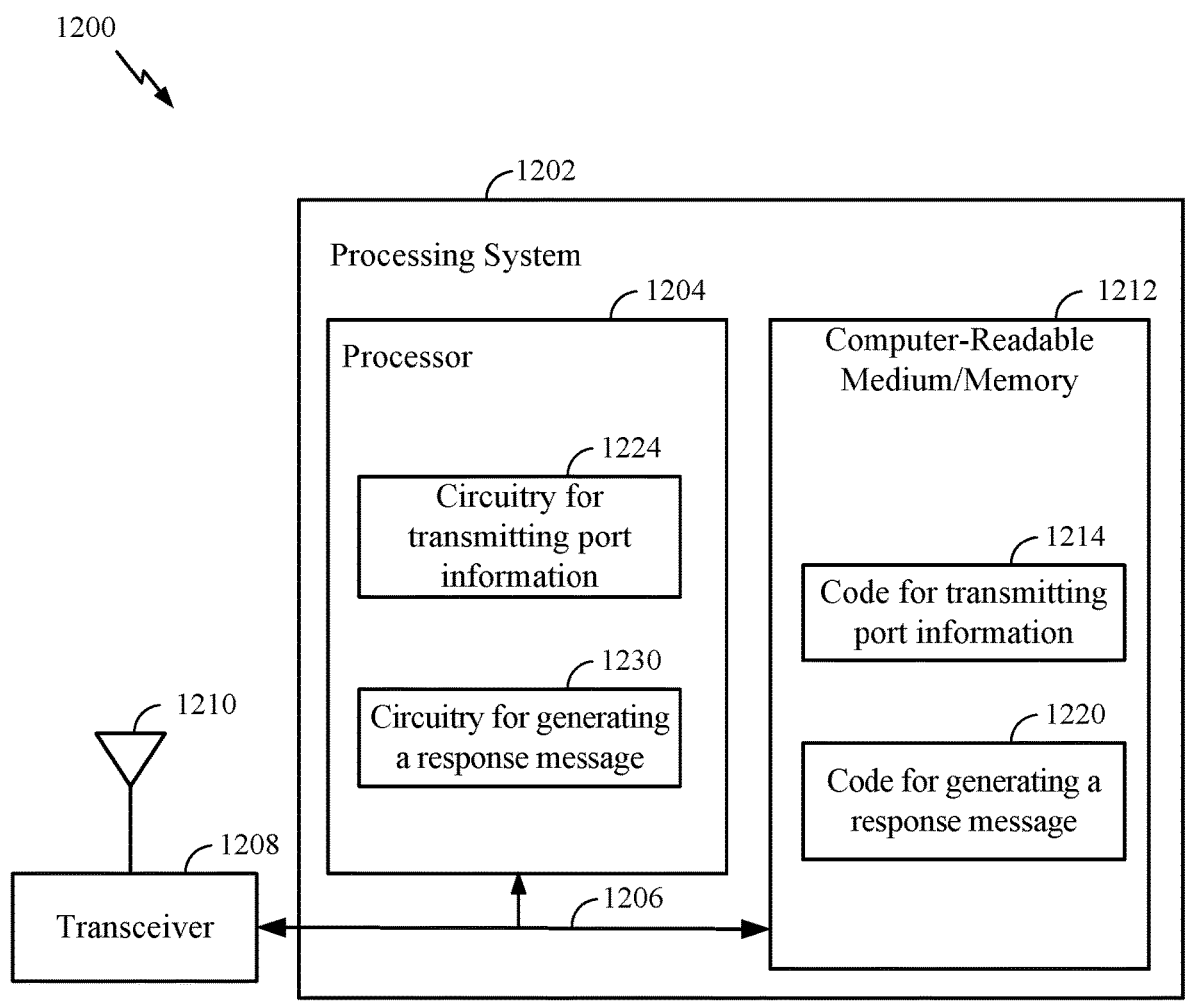
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9 or other operations for performing the various techniques discussed herein for port information signaling. In certain aspects, computer-readable medium/memory 1212 stores code for transmitting port information 1214 and code for generating a response message 1220. In certain aspects, the processor 1204 has circuitry configured to implement the code stored in the computer-readable medium/memory 1212. The processor 1204 includes circuitry for transmitting port information 1224 and circuitry for generating a response message 1230.

Example Aspects

In a first aspect, a method for wireless communication comprises receiving, at a network node, port information of one or more ports of one or more user equipments (UEs); and deriving, by the network node, a network topology indicating connectivity between devices comprising the one or more UEs based on the port information of the one or more ports. This may provide the network node with the ability to determine a network topology indicative of connectivity between network entities (e.g., UEs) having one or more standard ports and one or more intermediate ports.

In a second aspect, alone or in combination with the first aspect, the port information of a port comprises one or more of identifier information of the port or identifier information of one or more neighboring ports of the port. This may provide the network node with the information necessary to determine a network topology indicating connectivity between the entities in the network.

In a third aspect, alone or in combination with one or more of the first aspect and the second aspect, the identifier information comprises one or more of one or more medium access control (MAC) addresses, or one or more chassis identifiers. This may provide the network node with the information necessary to determine a network topology indicating connectivity between the entities in the network via a layer 2 (L2) communication.

In a fourth aspect, alone or in combination with one or more of the first through third aspects, the port information is received via one or more of access stratum (AS) signaling or non-access stratum (NAS) signaling. This may provide the network node with the information necessary to determine a network topology indicating connectivity between the entities in the network via different layers of communication.

In a fifth aspect, alone or in combination with one or more of the first through fourth aspects, the network node receives the port information via one or more intermediate nodes from the one or more UEs. This may reduce the communication timeline between a UE and the network.

In a sixth aspect, alone or in combination with one or more of the first through fifth aspects, the one or more intermediate nodes comprise one or more of a radio access network (RAN) node, an access and mobility management function (AMF), a session management function (SMF), or a policy control function (PCF). This provides a communication path between a UE and the network.

In a seventh aspect, alone or in combination with one or more of the first through sixth aspects, the port information of the one or more ports comprises port information of ports associated with multiple different protocol data unit (PDU) sessions, wherein the port information of ports associated with multiple different PDU sessions is received via separate signaling for each of the multiple different PDU sessions. This provides a basis for providing port information.

In an eighth aspect, alone or in combination with one or more of the first through seventh aspects, the port information is received via signaling during one or more of a protocol data unit (PDU) session establishment, a PDU session modification, or a UE registration. This provides a mechanism for providing port information.

In a ninth aspect, alone or in combination with one or more of the first through eighth aspects, at least one port of the one or more ports comprises an intermediate port configured to carry traffic with a final destination that is not local to a UE associated with the at least one port. This may provide the network node with the information necessary to determine a network topology indicating connectivity between the entities in the network via ports that have an initial source and/or a final destination address not local to the UE.

In a tenth aspect, alone or in combination with one or more of the first through ninth aspects, a response message for a link layer discovery protocol (LLDP) received by a UE of the one or more UEs is generated by one of the UEs, a UE adaptor associated with the UE, the network node, or an intermediate node. This provides a mechanism for responding to the LLDP.

In an eleventh aspect, a method for wireless communication comprises generating, by a network node, port information for one or more ports of one or more user equipments (UEs); and generating, by the network node, a response message for a link layer discovery protocol (LLDP) received by a UE of the one or more UEs on a first port of the UE using port information generated for the first port. This may provide the network node with the ability to determine a network topology indicative of connectivity between network entities (e.g., UEs) having one or more standard ports and one or more intermediate ports.

In a twelfth aspect, alone or in combination with the eleventh aspect, port information of a port comprises one or more of identifier information of the port or identifier information of one or more neighboring ports of the port. This may provide the network node with the information necessary to determine a network topology indicating connectivity between the entities in the network.

In a thirteenth aspect, alone or in combination with the eleventh and/or twelfth aspect, the identifier information comprises one or more of one or more medium access control (MAC) addresses, or one or more chassis identifiers. This may provide the network node with the information necessary to determine a network topology indicating connectivity between the entities in the network via a layer 2 (L2) communication.

In a fourteenth aspect, alone or in combination with one or more of the eleventh through thirteenth aspects, generated port information associated with a UE of the one or more UEs is sent to the UE. This provides the network node with a mechanism for communicating the generated port information to the UE.

In a fifteen aspect, alone or in combination with one or more of the eleventh through fourteenth aspects, the port information of the one or more ports comprises port information of ports associated with multiple different protocol data unit (PDU) sessions, wherein the port information of ports associated with multiple different protocol data unit (PDU) sessions is generated separately for each of the multiple different PDU sessions. This provides a basis for providing port information.

In a sixteenth aspect, alone or in combination with one or more of the eleventh through fifteenth aspects, the port information is generated during one or more of a protocol data unit (PDU) session establishment, a PDU session modification, or a UE registration. This provides a basis for generation of port information.

In a seventeenth aspect, alone or in combination with one or more of the eleventh through sixteenth aspects, the response message is generated by one of the UE, an intermediate node, the network node, or a UE adaptor associated with the UE. This provides a source of the response message.

In an eighteenth aspect, a method for wireless communication, comprises transmitting, from a user equipment (UE) to a network node, port information of one or more ports of the UE using one or more of access stratum (AS) signaling or non-access stratum (NAS) signaling; and generating, by the UE, a response message for a link layer discovery protocol (LLDP) received by the UE. This may provide the network node with the ability to determine a network topology indicative of connectivity between network entities (e.g., UEs) having one or more standard ports and one or more intermediate ports.

In a nineteenth aspect, alone or in combination with the eighteenth aspect, port information of a port comprises one or more of identifier information of the port or identifier information of one or more neighboring ports of the port. This may provide the network node with the information necessary to determine a network topology indicating connectivity between the entities in the network.

In a twentieth aspect, alone or in combination with the eighteenth aspect and/or the nineteenth aspect, at least one port of the one or more ports comprises an intermediate port configured to carry traffic with a final destination that is not local to the UE. This may provide the network node with the information necessary to determine a network topology indicating connectivity between the entities in the network via ports that have an initial source and/or a final destination address not local to the UE.

In a twenty-first aspect, alone or in combination with the eighteenth through twentieth aspects, the port information is transmitted via one or more intermediate nodes. This may reduce the communication timeline between a UE and the network.

In a twenty-second aspect, alone or in combination with the eighteenth through twenty-first aspects, the one or more intermediate nodes comprise one or more of a radio access network (RAN) node, an access and mobility management function (AMF), a session management function (SMF), or a policy control function (PCF). This provides a communication path between a UE and the network.

In a twenty-third aspect, alone or in combination with the eighteenth through twenty-second aspects, the port information of the one or more ports comprises port information of ports associated with multiple different protocol data unit (PDU) sessions, wherein the port information of ports associated with multiple different PDU sessions is transmitted via separate signaling for each of the multiple different PDU sessions. This provides a basis for providing port information.

In a twenty-fourth aspect, alone or in combination with the eighteenth through twenty-third aspects, the port information is transmitted via signaling during one or more of a protocol data unit (PDU) session establishment, a PDU session modification, or a UE registration. This provides a mechanism for providing port information.

In a twenty-fifth aspect, alone or in combination with the eighteenth through twenty-fourth aspects, at least one port of the one or more ports comprises an intermediate port configured to carry traffic with a final destination that is not local to the UE. This may provide the network node with the information necessary to determine a network topology indicating connectivity between the entities in the network via ports that have an initial source and/or a final destination address not local to the UE.

In a twenty-sixth aspect, alone or in combination with the eighteenth through twenty-fifth aspects, the response message is generated by one of the UEs, an intermediate node, the network node, or a UE adaptor associated with the UE. This provides a source of the response message.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication at a first network node external to a wireless communication system switch (WCS-SW), the WCS-SW comprising a user equipment (UE) of one or more UEs and at least one core network node of a cellular network, the method comprising:
   receiving, from the UE via the at least one core network node, port information of: (i) a port of the UE, and (ii) an intermediate port neighboring the port of the UE, wherein the intermediate port belongs to an intermediate node for carrying traffic from the UE to a final destination that is not local to the UE, and wherein each of the one or more UEs, the core network node, and the intermediate node form at least a portion of the WCS-SW; and
   deriving a network topology indicating connectivity between devices comprising the one or more UEs and the intermediate node based on the received port information.

2. The method of claim 1, wherein the port information comprises identifier information of the port and the intermediate port.

3. The method of claim 2, wherein the identifier information comprises one or more of one or more medium access control (MAC) addresses, or one or more chassis identifiers.

4. The method of claim 1, wherein the port information is received via one or more of access stratus signaling (AS) or non-access stratum (NAS) signaling.

5. The method of claim 1, wherein the first network node receives the port information via the intermediate node.

6. The method of claim 5, wherein the intermediate node comprises one of a radio access network (RAN) node, an access and mobility management function (AMF), a session management function (SMF), or a policy control function (PCF).

7. The method of claim 1, wherein each of the port of the UE and the intermediate port of the intermediate node are associated with multiple different protocol data unit (PDU) sessions, and wherein receiving the port information further comprises receiving, from the UE, port information associated with each of the multiple different PDU sessions via separate signaling for each of the multiple different PDU sessions.

8. The method of claim 1, wherein the port information is received during one or more of a protocol data unit (PDU) session establishment, a PDU session modification, or a UE registration.

9. The method of claim 1, wherein:
   the WCS-SW is an intermediate switch between: (i) at least one of a first device or a first network, and (ii) at least one of a second device or a second network; and
   the final destination is external to the WCS-SW.

10. A method for wireless communication by a network node, comprising:
    receiving, from a first network entity, a forwarded link layer discovery protocol (LLDP) message configured to solicit port information of a first port of the first network entity, the LLDP message transmitted to the first port of the first network entity via a second port of a second network entity, the first port being a neighbor to the second port, the first network entity and the second network entity forming a portion of a wireless communication system switch (WCS-SW);
    generating port information for one or more ports of the first network entity, the one or more ports including the first port; and
    generating and transmitting a LLDP response message indicating the port information generated for the one or more ports of the first network entity to the second network entity.

11. The method of claim 10, wherein the port information for the one or more ports comprises identifier information of each of the one or more ports.

12. The method of claim 11, wherein the identifier information comprises one or more of one or more medium access control (MAC) addresses, or one or more chassis identifiers.

13. The method of claim 10, wherein the first network entity is a first user equipment (UE), and wherein the second network entity is a second UE.

14. The method of claim 10, wherein the port information of the one or more ports comprises port information of ports associated with multiple different protocol data unit (PDU) sessions, wherein the port information of ports associated with multiple different PDU sessions is generated separately for each of the multiple different PDU sessions.

15. The method of claim 10, wherein the port information is generated during one or more of a protocol data unit (PDU) session establishment, a PDU session modification, or a UE registration.

16. A method for wireless communication at a user equipment (UE), comprising:
    transmitting, to a core network node, first port information of ports belonging to the UE using one or more of access stratus signaling (AS) or non-access stratum (NAS) signaling;
    receiving, from a first port of a first network node, a link layer discovery protocol (LLDP) message configured to solicit second port information of ports that belong to the UE and are neighbors to the first port, the UE and the first network node forming a first portion of a wireless communication system switch (WCS-SW);
    generating a response message to the received LLDP message, the response message comprising the second port information; and
    transmitting the response message to the first network node.

17. The method of claim 16, wherein the first port information and the second port information comprise identifier information of each corresponding port.

18. The method of claim 17, wherein the identifier information comprises one or more of one or more medium access control (MAC) addresses, or one or more chassis identifiers.

19. The method of claim 16, wherein the response message to the received LLDP message is transmitted to the first network node via one or more intermediate nodes that form a second portion of the WCS-SW.

20. The method of claim 19, wherein the one or more intermediate nodes comprise one or more of a radio access network (RAN) node, an access and mobility management function (AMF), a session management function (SMF), or a policy control function (PCF).

21. The method of claim 16, wherein the first port information and the second port information each comprise port information associated with multiple different protocol data unit (PDU) sessions, wherein the first port information is transmitted via separate signaling for each of the multiple different PDU sessions, and wherein the response message to the first network node comprising the second port information is transmitted via separate signaling for each of the multiple different PDU sessions.

22. The method of claim 16, wherein the first port information and the second port information are transmitted via signaling during one or more of a protocol data unit (PDU) session establishment, a PDU session modification, or a UE registration.

23. The method of claim 16, further comprising transmitting the response to the first network node via an intermediate port of an intermediate node, the intermediate port configured to carry traffic to the first network node that is not local to the UE.

24. The method of claim 16, wherein the response message is generated by a UE adaptor associated with the UE, the UE adaptor providing an interface between the WCS-SW and devices outside of the WCS-SW.

25. A user equipment (UE) configured for wireless communication, comprising:
a memory; and
a processor communicatively coupled to the memory, wherein the processor is configured to:
transmit, to a core network node, first port information of ports belonging to the UE using one or more of an access stratum (AS) signaling or non-access stratum (NAS) signaling;
receive, from a first port of a first network node, a link layer discovery protocol (LLDP) message configured to solicit second port information of ports that belong to the UE and are neighbors to the first port, the UE and the first network node forming a first portion of a wireless communication system switch (WCS-SW);
generate a response message to the received LLDP message, the response message comprising the second port information; and
transmit the response message to the first network node.

26. The UE of claim 25, wherein the first port information and the second port information comprise identifier information of each corresponding port.

27. The UE of claim 26, wherein the processor is further configured to transmit the response to the first network node via an intermediate port of an intermediate node, the intermediate port configured to carry traffic to the first network node that is not local to the UE.

28. The UE of claim 25, wherein the response message to the received LLDP message is transmitted to the first network node via one or more intermediate nodes that form a second portion of the WCS-SW.

* * * * *